United States Patent [19]
Böhm

[11] 3,973,262
[45] Aug. 3, 1976

[54] RADIO DIRECTION FINDER WITH MEANS FOR REDUCING SENSITIVITY TO MULTIPATH PROPOGATION ERRORS

[75] Inventor: Manfred Böhm, Stuttgart, Germany

[73] Assignee: International Standard Electric Corporation, New York, N.Y.

[22] Filed: Nov. 21, 1974

[21] Appl. No.: 525,843

[30] Foreign Application Priority Data
Nov. 24, 1973 Germany............................ 2358585

[52] U.S. Cl. ......................... 343/113 R; 343/112 C
[51] Int. Cl.² ........................................... G01S 5/02
[58] Field of Search ............ 343/112 C, 113 R, 114; 235/150.27, 150.271

[56] References Cited
UNITED STATES PATENTS
3,237,196  2/1966  Hampton ........................ 343/112 C
3,311,738  3/1967  Makow ........................... 343/112 C Primary Examiner—T.H. Tubbesing
Assistant Examiner—T. M. Blum
Attorney, Agent, or Firm—William T. O'Neil

[57] ABSTRACT

A surface based direction finder for determining the direction of radiations from a remote station (aircraft for example), using a plural element linear or circular receiving antenna array. The arriving energy phases are measured in at least one element group with two element pairs, (for example) the elements of each pair being equally spaced and aligned so that a line joining elements of even ordinal number is parallel to the line joining the elements with odd ordinal numbers. The amplitudes ($m1$, $m2$, $m3$ and $m4$) and the phases ($\alpha 1$, $\alpha 2$) of the rf signal picked up by each element are measured separately and the phase $\beta$ of the desired wave is determined by computer solution of the typical equation derived from the law of consines;

$$m1^2 + m2^2 - 2m1\, m2\, \cos(\alpha 1 - \beta) = m3^2 + m4^2 - 2m3m4 \cos(\alpha 2 - \beta).$$

Other configurations employing three elements in line and elements in a circle are also described and the corresponding cosine law equations given.

6 Claims, 9 Drawing Figures

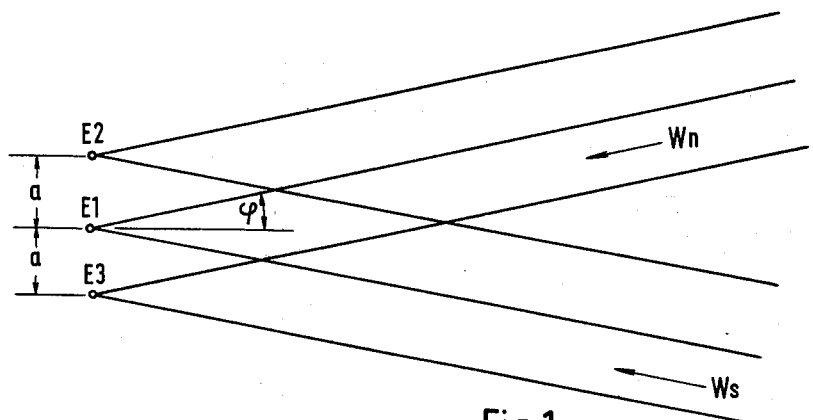
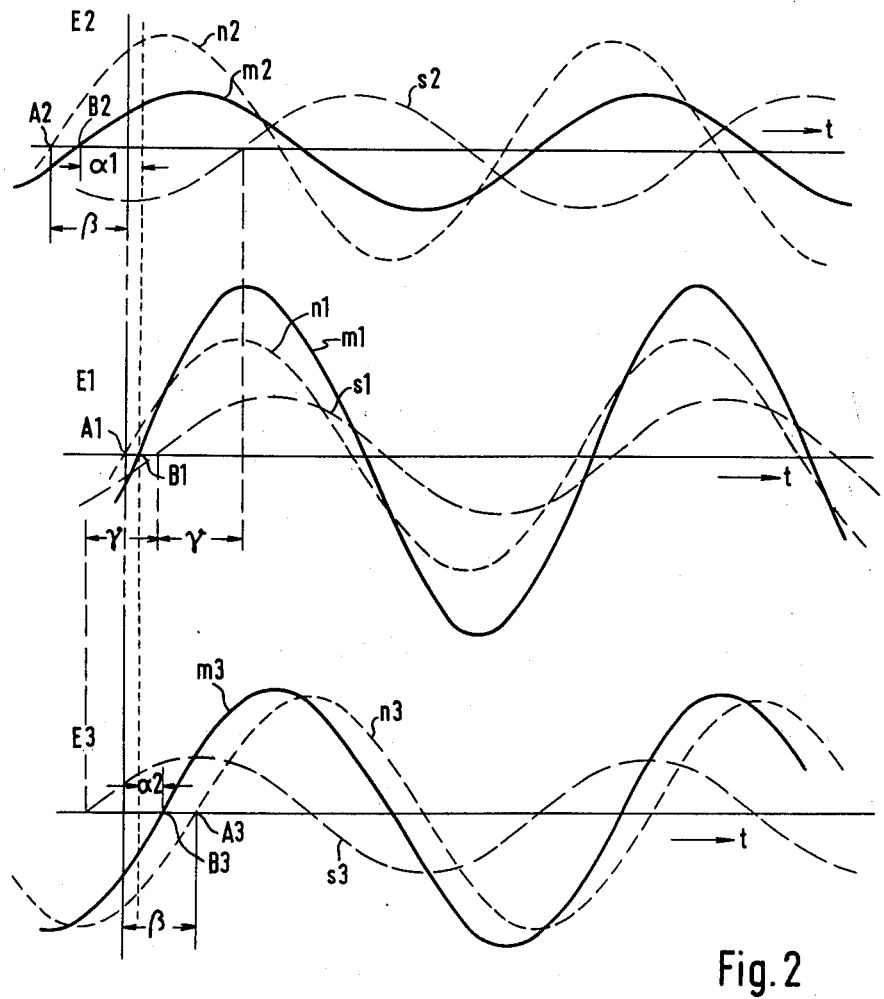

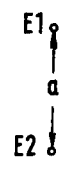
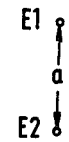
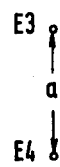
Fig.5a
Fig.5b
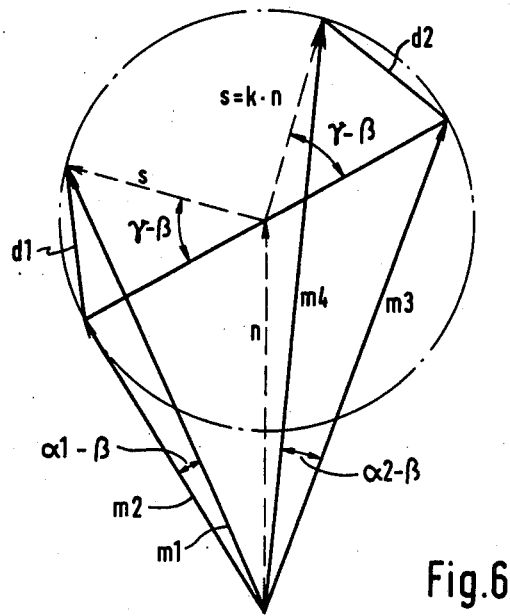
Fig.6

… (3,973,262)

RADIO DIRECTION FINDER WITH MEANS FOR REDUCING SENSITIVITY TO MULTIPATH PROPOGATION ERRORS

BACKGROUND OF THE INVENTION

1. Field of the Invention

The present invention relates to radio direction finders generally, and particularly to those having a plurality of antenna elements; the angle of arrival of an electromagnetic wave being determined from the phases occurring at the elements.

2. Description of the Prior Art

A direction finder of the kind to which the invention applies is described in an article by F. Steiner, entitled "Grossbasispeiler nach dem Dopplerprinzip" and published in Germany in the periodical "Nachrichtentechnische Fachberichte" 12 (1958).

Wide-base direction finders are relatively insensitive to errors caused by multipath propagation, however, they have the disadvantage of occupying much space. Circular and linear antenna arrays are known which are 5 λ in diameter and length, respectively. However, the smaller the base, the more the measurement result will be affected by errors due to multipath propagation.

The manner in which the present invention deals with this problem will be evident as the description proceeds.

SUMMARY OF THE INVENTION

It may be said to have been the object of the invention to provide a direction finder or radio beacon of small base with which the same insensitivity to errors caused by multipath propagation can be achieved as with wide-base direction finders.

The invention permits the construction of small-size antenna systems for direction finders and radio beacons. For mobile installations, the antenna systems can be made small enough to be mounted on, or transported with, motor vehicles.

In the case of wide-base systems, even less sensitivity to multipath propagation errors can be achieved with the invention than heretobefore possible.

BRIEF DESCRIPTION OF THE DRAWINGS

FIG. 1 shows three antenna elements of a linear antenna array at which a desired wave and a spurious (unwanted) wave arrive.

FIG. 2 shows the time response of the rf voltages measurable at the antennas of FIG. 1, as well as the desired and spurious components of these voltages.

FIGS. 5a and 5b are two examples of the arrangement of four-element groups.

FIG. 6 is a normalized vector diagram for the arrangements of FIG. 5, corresponding to that of FIG. 4.

DESCRIPTION OF THE PREFERRED EMBODIMENT

Figure 3:
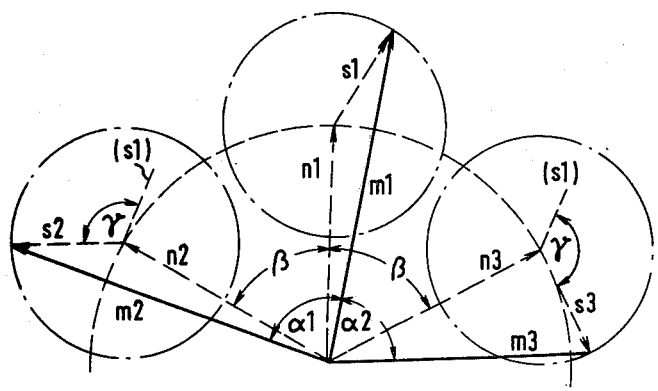
FIG. 3 shows a vector diagram relating to FIG. 2.

The principle underlying the arrangement in accordance with the invention will first be explained as applied to a direction finder. On the surface (ground) there is provided a linear of circular antenna array whose antenna elements receive the electromagnetic wave radiated from an airborne station whose direction is to be determined.

The antennas are either connected successively to a single receiver with which the amplitude and the phase of the field existing at each element at the measuring instant are determined and stored, or a separate receiver is provided for each element. Each measurement covers several cycles of the wave. In this way, the field-strength distribution along the antenna array employed is determined. From the field-strength distribution along the aperture (which distribution is not measured continuously, but rather is sampled in accordance with the number of elements) the direction of the transmitter can be determined.

If the electromagnetic wave radiated from the airborne station reaches the elements of the antenna array only by a direct path (desired wave), the phase measurements alone can be used to provide the angle of arrival with sufficient accuracy. If, however, the electromagnetic wave radiated from the airborne station can also reach the antennas of the ground station by another way, e.g., through reflection from the ground or from objects (spurious wave), the direct and the reflected wave will add together vectorially at the antennas, invalidating the result of the measurement.

If it is assumed that the received electromagnetic wave is radiated or reflected from a point so distant that the incident waves may be thought of as having plane wavefronts, the invention permits the determination of the desired wave's angle of arrival.

Referring now to FIG. 1, there are shown three like, equally spaced (spacing $= a$) antenna elements E2, E1, E3 which are located on a straight line. If $\psi$ is taken as the angle between a desired wave $Wn$ and a perpendicular on the connection line between the elements, and if $\beta$ is the phase angle between the signals measured at the elements E2 and E1 or E1 and E3, then $$\beta = \frac{2\pi a}{\lambda} \sin \psi, \text{ and thus } \psi = \arcsin \frac{\lambda}{2\pi a} \beta \qquad \text{Eq. 1}$$

($\lambda$ = wavelength).

If, in addition to the desired wave $Wn$, an equal-frequency spurious wave $Ws$ occurs (it being assumed that the amplitude of the spurious wave is smaller than that of the wanted wave) the two waves $Wn$ and $Ws$ will add together vectorially. Thus, the phase angle $\beta$ measured between the elements E2 and E1 or E1 and E3 is no longer the same, but a phase angle $\alpha 1$ is measured between E2 and E1, and a phase angle $\alpha 2$ between E1 and E3.

FIG. 2 shows the time response of the signals measured at the antennas E1, E2 and E3. Values $m1$, $m2$, $m3$ are the amplitudes of the vector sum of the desired wave and the spurious wave; $n1$, $n2$, $n3$ are the amplitudes of the desired wave, and $s1$, $s2$, $s3$ are the amplitudes of the spurious wave. $\beta$ is the phase angle between $n1$ and $n2$ or $n3$, and $\lambda$ is the phase angle between $s1$ and $s2$ or $s1$ and $s3$. $\beta$ is assumed to be 60°, and $n2$ is assumed to lead $n1$. It is also assumed that the amplitude of $Wn$ is twice as large as that of $Ws$, and that the angle of arrival of $Ws$ is equal to $360° - \psi$.

As can be seen, the zero crossings of the desired wave $Wn$ are at A1, A2 and A3; $\beta$ thus corresponds to the distance $\overline{A1A2}$ or $\overline{A1A3}$. If the spurious wave $Ws$ is added, the zero crossing shifts from A1 to B1, from A2 to B2, and from A3 to B3. The distance $\overline{B1B2}$ now corresponds to the angle $\alpha 1$, and the distance $\overline{B1B3}$ to the angle $\alpha 2$.

FIG. 3 shows the vector diagram of the curves of FIG. 2 at an arbitrary instant. The measured values are $m1$, $m2$, $m3$, $\alpha 1$ and $\alpha 2$.

Figure 4:
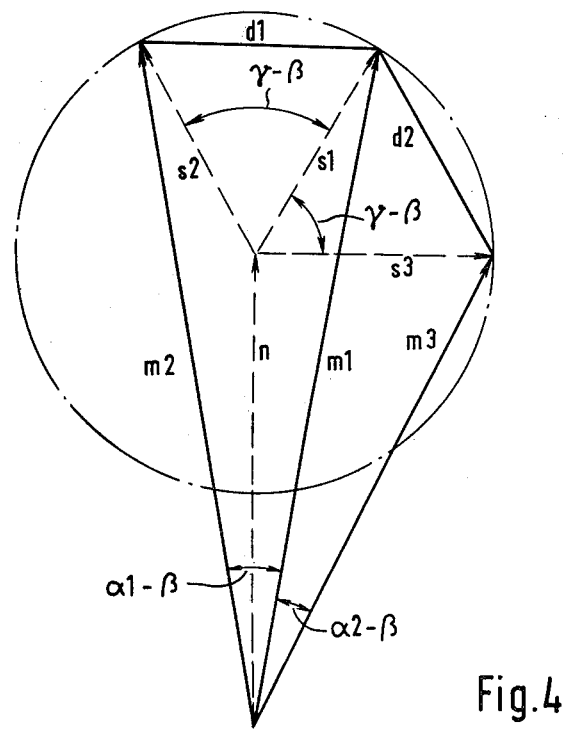
FIG. 4 shows a normalized vector diagram in which the vectors of FIG. 3 have been turned so that the desired vectors coincide (twice the scale of FIG. 3).

It will now be shown with the aid of FIG. 4 how the desired phase $\beta$ can be determined from these measured values. For clarity, the vectors are shown twice as long as in FIG. 3. The desired vectors $n2$ and $n3$ have been turned through the angle $\beta$ so as to coincide with the wanted vector $m1$. The angles between the desired vectors $s1$ and $s2$ and between the desired vectors $s1$ and $s3$ are now both $\gamma - \beta$, while the angle between the measured vectors $m1$ and $m2$ is $\alpha 1 - \beta$, and that between $m1$ and $m3$ is $\alpha 2 - \beta$. The distances designated $d1$ and $d2$ are equal.

Using the cosine law for $d1$ and $d2$ one obtains (because $d1=d2$)

$$m1^2 + m2^2 - 2m1m2\cos(\alpha 1 - \beta) = m1^2 + m3^2 - 2m1m3\cos(\alpha 2 - \beta) \quad \text{(Eq. 2)}$$

This equation (2) contains, in addition to the unknown quantity $\beta$, only the measured values $m1$, $m2$, $m3$, $\alpha 1$, $\alpha 2$, so that it is possible to calculate $\psi$ and thus, the angle of arrival $\beta$.

At a given angle of arrival $\psi$, the spacing $a$ between the antenna elements of a pair determines the value of the measured phase angles $\alpha 1$ and $\alpha 2$. The greater $a$ is made, the higher becomes the resolution and the smaller is the effect of phase-measuring errors due to the measuring apparatus in terms of error of the angle of arrival $\psi$ to be determined. Conversely, the higher the accuracy of the measuring apparatus can be made for phase and amplitude, the smaller $a$ can be made.

In othe words, even with a small aperture it is possible to measure as accurately as the measuring apparatus permits if only one reflecting object is present. The action to be taken if a plurality of reflecting objects are present will be described below.

The arrangement of FIG. 1 so far described, i.e., with three antenna elements, is a special case of the more general arrangement with four antenna elements. Two examples of the latter arrangement are shown in FIGS. 5a and 5b. In this case, it is not necessary that all four elements be located on a straight line. What is important is that the spacings $a$ between the elements of each pair of equal, and that the connection lines between the even-numbered and the odd-numbered elements of the pairs be parallel.

FIG. 6 shows the vector diagram for such arrangements as FIG. 5, (in the manner of FIG. 4). The two sectors of the circle which are limited by the spurious vectors $s$ no longer border on each other as in the arrangement of FIG. 1. The positions of the sectors are determined by the location of the pairs of antenna elements.

For this case, Equation (2) is modified to become $$m1^2 + m2^2 - 2m1m2\cos(\alpha 1 - \beta) - m3^2 + m4^2 - 2m3m4\cos(\alpha 2 - \beta) \quad \text{(Eq. 3)}$$

The arrangement with four elements and the arrangement with three elements each permit an exact determination of the angle of arrival of the desired wave if only one spurious wave is present, however, such a condition obtains only with a plane, homogeneous reflecting surface. In natural surroundings, a plurality of spurious waves with different angles of arrival, phases and amplitudes are likely.

Figure 7:
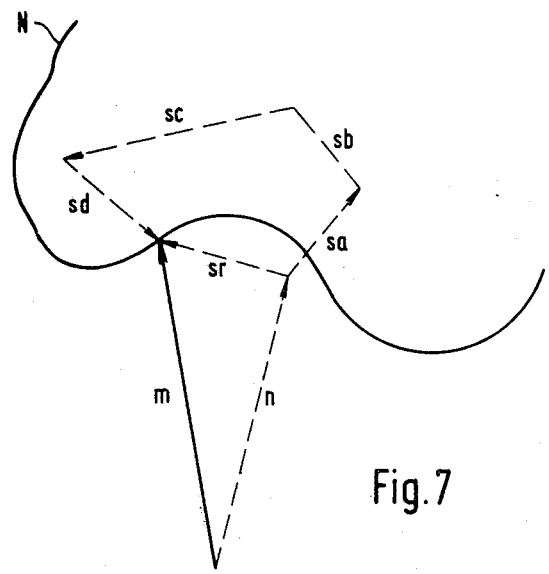
FIG. 7 is a normalized vector diagram for the case of four arbitrary spurious unwanted waves.

FIG. 7 shows a vector diagram for one of the antenna elements, which diagram corresponds to that of FIG. 3. The head of the measured vector $m$ moves on a locus N. Superimposed on a desired vector $n$ are the spurious vectors $sa$ to $sd$, which, as a vector sum, give the resultant spurious vector $sr$. For each antenna element a different resultant spurious vector $sr$ is obtained. Therefore, the heads of the spurious vectors are no longer located on a circle around the head of $n$, and thus $d1 \neq d2$.

If the angle of arrival of the desired wave is determined from Equation (2) or (3) in the environment of a plurality of spurious waves, no accurate result is obtained. An accurate result is however obtained by using antenna arrays with more than three or four elements. To obtain the measurement results, groups of three or four elements are formed and the angle of arrival of the desired wave is determined from the separate measured values for each group; then the mean of these individual results is taken. That mean may be the arithmetic mean or a mean obtained by another suitable mathematic process.

Of the possible antenna arrays having a plurality of elements, the linear array and the circular array can be used with particular advantage.

In the case of the antenna array with $n$ elements, groups can be formed by combining the first, second, and third elements, the second, third, and fourth elements, etc., and finally the $(n-2)^{th}$, $(n-1)^{th}$ and $(n)^{th}$ elements. If $n = 30$, 29 groups of three elements can be formed which have the smallest possible spacing $a$. It is also possible, however, to form three-element groups with an element spacing which is the multiple of $a$.

In the case of the circular array with $2n$ elements there are several group forming possibilities. If there is a center element, each three-element group can be formed from the $i^{th}$ element, the center element, and the $(n+i)^{th}$ element.

Figure 8:
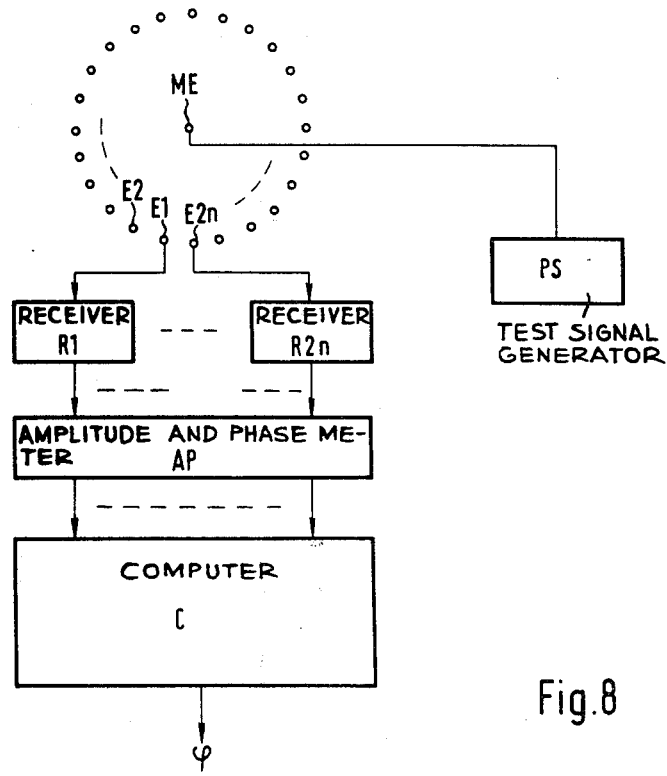
FIG. 8 is a block diagram of a radio direction finder with circular antenna array.

It is also possible, however, to form groups of four elements. For this case, FIG. 8 shows a block diagram of a complete radio beacon, comprising a circular array whose elements are designated E1 to E2$n$. Connected to the receivers R1 and R2$n$ is an amplitude and phase meter AP, which delivers the measured values, separately for each antenna, to a computer C. The computer C determines the angle $\psi$ according to Equations (3) and (1), with the measured values of each two opposite element pairs being combined into groups of four and the individual results being averaged.

FIG. 8 also shows a center element ME which is connected to a test signal generator PS. Via the center element, calibration pulses for all receivers R1 and R2$n$ are radiated at regular intervals. No measurement can be carried out for the duration of the calibration pulses.

This direction finder can be used with particular advantage in connection with the arrangement disclosed in German Published Application No. 2,038,982.

The inventive concepts have thus far been described only with respect to radio direction finders, but it also applies to radio beacons. In the case of a direction finder, one receiver is provided for each antenna element; thus, simultaneous reception and simultaneous evaluation of the signals are possible. In the case of a radio beacon, however, only successive radiation of the signals from the individual elements is possible (simultaneous transmission would produce a sum pattern). Information on the transmitting antenna must therefore be transmitted to the receiver. In addition, a reference signal must be transmitted. Otherwise, however, the reflection errors can be reduced in the same manner as with a direction finder. As in the case of a direction finder, groups of three equidistant elements are formed from the elements of an antenna array. The three elements are fed successively with equal amplitude and phase from one transmitter. The signals falsified by reflections are received; amplitude and phase are measured, and the measured values are processed as described.

The quantities of interest can alternatively be obtained in the video range by using a sideband technique rather than through processing in RF or IF domains.

What is claimed is:

1. A radio direction finder comprising:
    a plurality of antenna elements, each of said elements being located to receive incident waves at an amplitude which is the vector sum of desired signal and spurious signals of lesser amplitude, if any;
    amplitude measuring means for determining the amplitude of the sum signal received at each of said elements;
    phase measuring means for determining the phase difference of received signal between at least two selected element pairs;
    and angle computing means responsive to said amplitude and phase measuring means for applying the law of cosines to determine the angle of arrival of the strongest signal, corresponding to said desired signal, the values determined by said amplitude measuring means corresponding to the sides of a triangle of receiving element sum signal vectors, said angle computing means being operative to determine the angle of said triangle corresponding to the angle of arrival of the signal represented by the largest of said vectors.

2. Apparatus according to claim 1 including switching means for successively sampling the signals received by said antenna elements, said switching means providing the inputs to said amplitude and phase measuring means.

3. A radio direction finder having a plurality of consecutively numbered antenna elements in an array, for determining the angle of arrival of an electromagnetic wave from the phases of received energy at said elements, comprising:
    first means including at least two selected pairs of said antenna elements each including two elements, said elements of each pair being equally spaced and arranged so that a line joining the elements with even ordinal numbers is parallel to the line joining elements with odd ordinal numbers;
    second means for separately measuring the amplitudes $m1$, $m2$, $m3$ and $m4$ and the phases $\alpha1$ and $\alpha2$ of the $rf$ voltages picked up by each element;
    and third means including a computer responsive to said second means for determining the phase $\beta$ of the desired wave in the condition of unequal values in amplitude and phase measured values denoting the presence of a spurious signal of the same frequency as the desired wave, said third means operating to solve the equation:

$$m1^2 + m2^2 - 2m1\, m2 \cos(\alpha1-\beta) = m3^2 + m4^2 - 2m3\, m4 \cos(\alpha2-\beta)$$

for the value of said $\beta$.

4. Apparatus according to claim 3 in which said antenna elements are located on a circle and that said two pairs of elements each comprise an element on said circle and the element diametrically opposed on said circle.

5. Apparatus according to claim 3 further defined in that said antenna elements are three in number and are arranged in a linear array.

6. Apparatus according to claim 3 further defined in that said amplitude and phase measuring circuits are operative to measure all of said amplitudes and phases contemporaneously.

* * * * *